(12) United States Patent
Trzaskos et al.

(10) Patent No.: US 9,013,888 B2
(45) Date of Patent: Apr. 21, 2015

(54) SYSTEMS AND METHODS FOR EJECTING REMOVABLE ENTITIES FROM ELECTRONIC DEVICES

(71) Applicant: Apple Inc., Cupertino, CA (US)

(72) Inventors: Piotr S. Trzaskos, Saratogo, CA (US); Simon Kao, Taiepei (TW)

(73) Assignee: Apple Inc., Cupertino, CA (US)

( * ) Notice: Subject to any disclaimer, the term of this patent is extended or adjusted under 35 U.S.C. 154(b) by 212 days.

(21) Appl. No.: 13/631,597

(22) Filed: Sep. 28, 2012

(65) Prior Publication Data

US 2014/0092571 A1    Apr. 3, 2014

(51) Int. Cl.
| | |
|---|---|
| *H05K 7/00* | (2006.01) |
| *G06K 13/08* | (2006.01) |
| *G06F 1/16* | (2006.01) |
| *H04M 1/02* | (2006.01) |

(52) U.S. Cl.
CPC .......... *G06K 13/0806* (2013.01); *G06F 1/1658* (2013.01); *H04M 1/026* (2013.01)

(58) Field of Classification Search
CPC ............ H05K 7/00; H05K 5/00; H05K 13/00
USPC .......................... 361/754; 439/159; 29/592.1
See application file for complete search history.

(56) References Cited

U.S. PATENT DOCUMENTS

| | | | | |
|---|---|---|---|---|
| 5,179,505 | A * | 1/1993 | Matsuo .......................... | 361/754 |
| 6,010,344 | A * | 1/2000 | Muramatsu et al. .......... | 439/159 |
| 6,587,350 | B1 * | 7/2003 | Lin et al. ....................... | 361/754 |
| 2012/0193022 | A1 * | 8/2012 | Yamasita et al. ............. | 156/249 |

\* cited by examiner

*Primary Examiner* — Jayprakash N Gandhi
*Assistant Examiner* — Mandeep Buttar
(74) *Attorney, Agent, or Firm* — Brownstein Hyatt Farber Schreck, LLP

(57) ABSTRACT

Systems and methods for ejecting removable entities from electronic devices are provided. A removable entity ejection system may include a driver that may be controllable by software (e.g., via a control unit that may be configured to send electrical signals to the driver). The driver may include a driving component that may apply a force directly, or indirectly, to one or more removable entities to eject the one or more removable entities from an electronic device. When the force is applied indirectly, one or more interfacing components may receive the applied force and may transfer the received force to the one or more removable entities to cause ejection thereof.

24 Claims, 13 Drawing Sheets

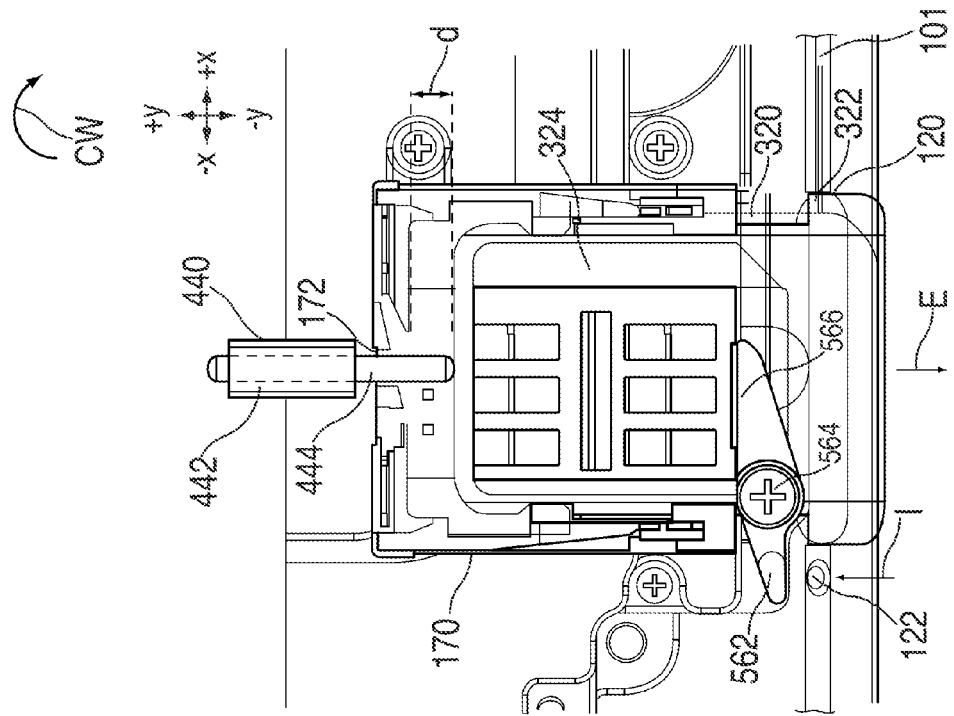
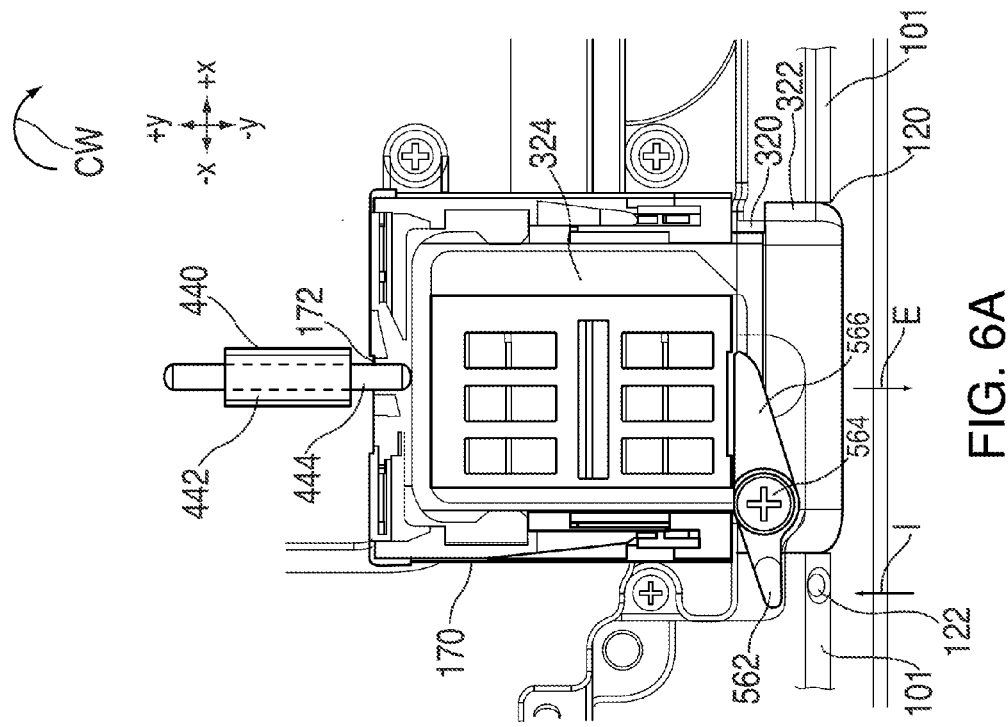

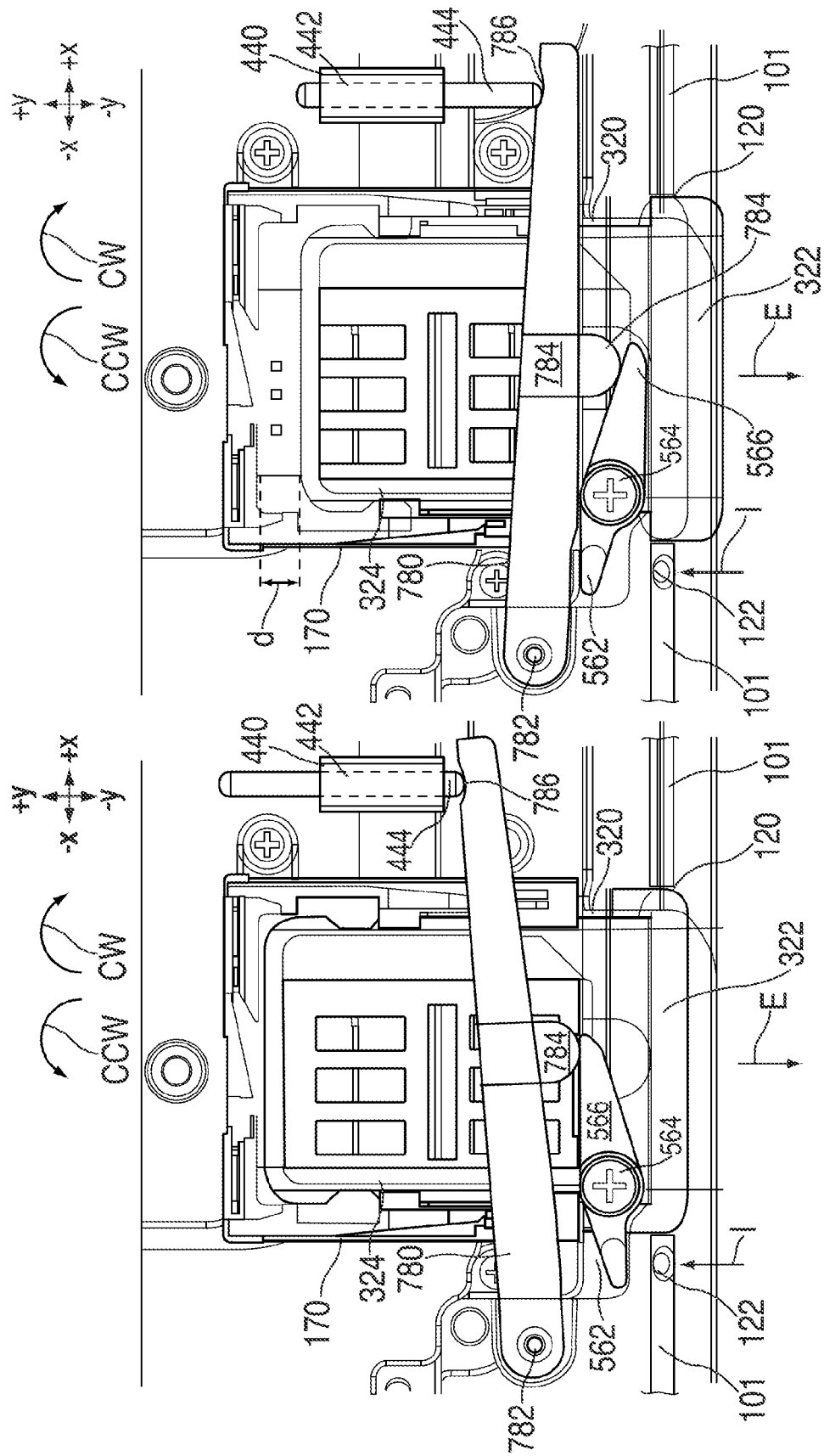

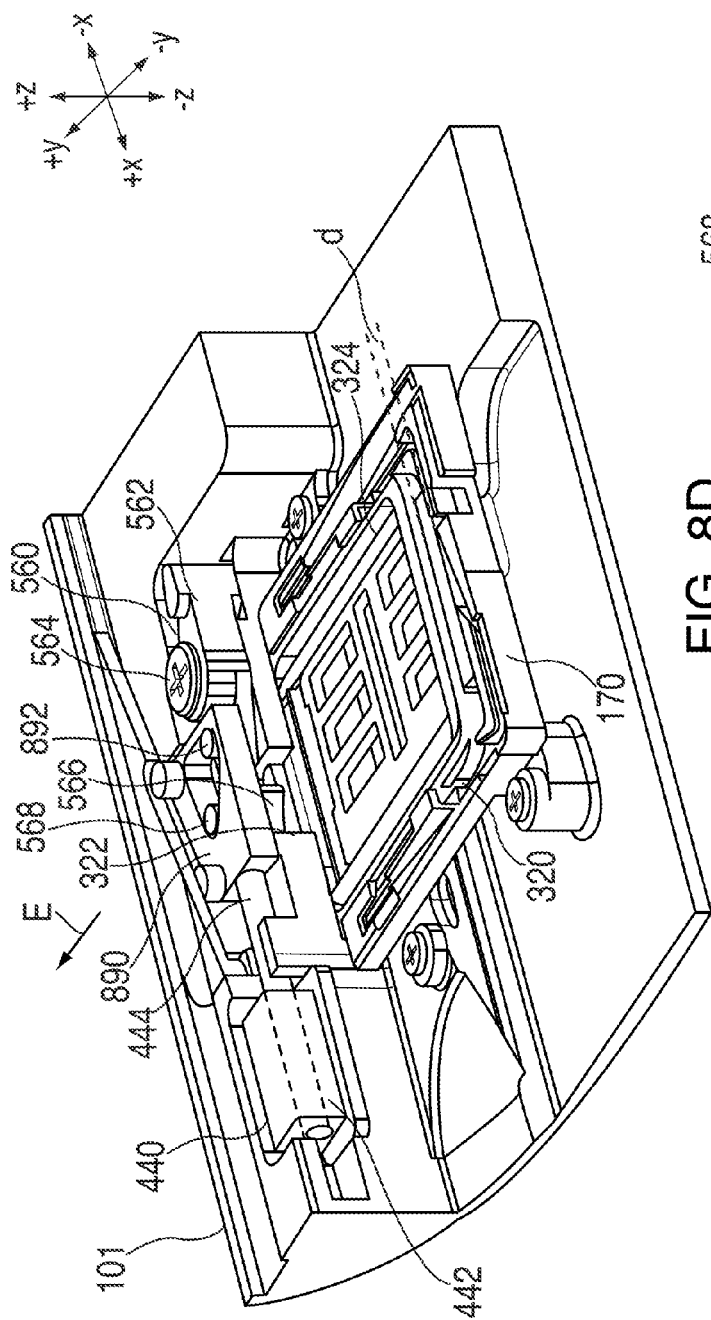
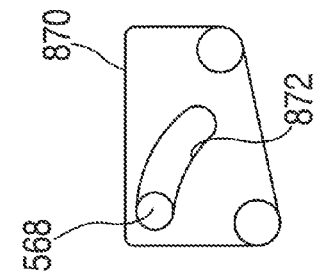
FIG. 8D
FIG. 8E

SYSTEMS AND METHODS FOR EJECTING REMOVABLE ENTITIES FROM ELECTRONIC DEVICES

FIELD OF THE INVENTION

This can relate to systems and methods for ejecting removable entities, and more particularly, to systems and methods for ejecting removable entities from electronic devices.

BACKGROUND OF THE DISCLOSURE

Many devices these days include one or more removable entities, such as a subscriber identity module ("SIM") card, that store information used (e.g., by a wireless network operator) to identify a subscriber of the device. Such devices include mobile telephones, tablet devices, computers, and other electronic devices. Oftentimes, an owner of a device may desire to eject a removable entity from the device (e.g., when sending the device in for repairs or traveling to a foreign country that supports the storage medium, but not the device). However, typical devices employ removable entity ejection systems that require the user to perform a manual action (e.g., inserting an ejection tool into the device), which may be disadvantageous. For example, during a manual ejection procedure, the user may damage the removable entity or even the device. Further, because the removable entity may store identification information pertaining to the owner of the device, the removable entity may be subject to theft by anyone with physical access to the device. That is, in addition to, or in lieu of, stealing the device, a thief may access personal information stored in the removable entity, even if the device's user interface is locked or inaccessible (e.g., by password protection). Accordingly, there is a need to improve current removable entity ejection system designs for ejecting storage media from electronic devices.

SUMMARY OF THE DISCLOSURE

Systems and methods for ejecting removable entities from electronic devices are provided. An electronic device may include a removable entity retention system for retaining and/or coupling to one or more removable entities. The electronic device may also include a removable entity ejection system for ejecting the one or more removable entities from the removable entity retention system.

The removable entity retention system may include an aperture (e.g., configured as part of a housing of the electronic device) for passing the one or more removable entities into and out of the electronic device. The retention system may also include one or more retention support structures for holding or coupling to portions of the one or more removable entities when the one or more removable entities are at least partially passed into the electronic device.

The removable entity ejection system may include a driver that may apply a force to the one or more removable entities to eject the one or more removable entities from the retention system of the electronic device. In particular, the driver may include a driving component and a driving unit that may be configured to direct displacement of the driving component to apply the force to the one or more removable entities. The removable entity ejection system may be manually and/or electrically controllable (e.g., via control circuitry that may be configured to send electrical signals to the removable entity ejection system). The driver may include any type of suitable driver that may have an electrically controllable driving unit for directing displacement of the driving component, such as a rotary motor, a servomotor, a linear motor, or any suitable type of motor or actuator. The removable entity ejection system may also include one or more ejection arms and/or guide members. These ejection arms and/or guide members may individually, or in combination, interface the driving component with at least one removable entity that may be retained by the removable entity retention system. The ejection arms and/or guide members may be configured to move (e.g., due to the force being applied by the driving component or a force being manually applied by a user) so as to eject the at least one removable entity.

In some embodiments, an electronic device may be provided. The electronic device may include a housing and a driver. The driver may include a driving unit and a driving component protruding from a first portion of the driving unit in a first direction. The driving unit may be configured to displace the driving component with respect to the first portion in the first direction to at least partially eject at least one removable entity from the housing.

In some embodiments, a method for ejecting at least one removable entity from an electronic device using a driver that includes a driving unit and a driving component protruding from a first portion of the driving unit in a first direction may be provided. The method may include receiving with the electronic device a user instruction to eject the at least one removable entity from the electronic device. In response to the receiving, the method may also include actuating with the electronic device the driving unit to displace the driving component with respect to the first portion in the first direction to at least partially eject the at least one removable entity from the electronic device.

BRIEF DESCRIPTION OF THE DRAWINGS

The above and other aspects and advantages of the invention will become more apparent upon consideration of the following detailed description, taken in conjunction with accompanying drawings, in which like reference characters refer to like parts throughout, and in which:

FIG. 6A is a plan view of a removable entity ejection system, in a first state, in accordance with at least one embodiment of the invention;

FIG. 6B is a plan view of the removable entity ejection system of FIG. 6A, in a second state, in accordance with at least one embodiment of the invention;

FIG. 7A is a plan view of an alternative removable entity ejection system, in a first state, in accordance with at least one embodiment of the invention;

FIG. 7B is a plan view of the alternative removable entity ejection system of FIG. 7A, in a second state, in accordance with at least one embodiment of the invention;

FIG. 8D is a perspective view of the alternative removable entity ejection system of FIG. 8B, in the second state of FIG. 8B, in accordance with at least one embodiment of the invention;

FIG. 8E is a plan view of an alternative guiding member that may be a part of the alternative removable entity ejection system of FIG. 8A, in accordance with at least one embodiment of the invention;

DETAILED DESCRIPTION OF THE DISCLOSURE

Figure 1:
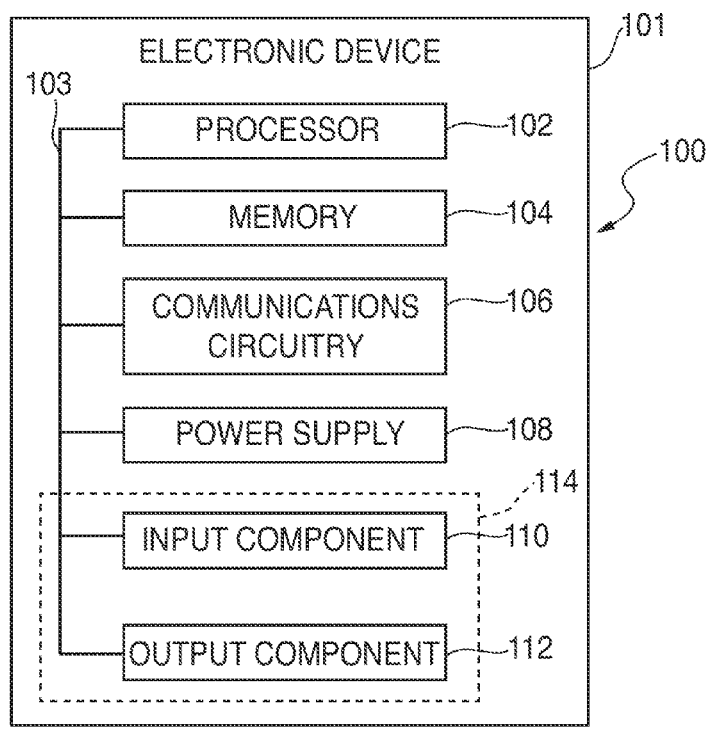
FIG. 1 is a schematic view of an illustrative electronic device, in accordance with at least one embodiment of the invention.

FIG. 1 is a schematic view of an illustrative electronic device 100, in accordance with some embodiments. Electronic device 100 may be any portable, mobile, or hand-held electronic device. Alternatively, electronic device 100 may not be portable at all, but may instead be generally stationary. Electronic device 100 can include, but is not limited to, a music player (e.g., an iPod™ available by Apple Inc. of Cupertino, Calif.), video player, still image player, game player, other media player, music recorder, movie or video camera or recorder, still camera, other media recorder, radio, medical equipment, domestic appliance, transportation vehicle instrument, musical instrument, calculator, cellular telephone (e.g., an iPhone™ available by Apple Inc.), other wireless communication device, personal digital assistant, remote control, pager, computer (e.g., a desktop, laptop, tablet, server, etc.), monitor, television, stereo equipment, set up box, set-top box, boom box, modem, router, printer, and combinations thereof.

Electronic device 100 may include a processor or control circuitry 102, memory 104, communications circuitry 106, power supply 108, input component 110, and output component 112. Electronic device 100 may also include a bus 103 that may provide one or more wired or wireless communication links or paths for transferring data and/or power to, from, or between various other components of device 100. In some embodiments, one or more components of electronic device 100 may be combined or omitted. Moreover, electronic device 100 may include other components not combined or included in FIG. 1. For example, electronic device 100 may include motion-sensing circuitry, a compass, positioning circuitry, or several instances of the components shown in FIG. 1. For the sake of simplicity, only one of each of the components is shown in FIG. 1.

Processor 102 of device 100 may include any processing circuitry operative to control the operations and performance of one or more components of electronic device 100. For example, processor 102 may be used to run operating system applications, firmware applications, media playback applications, media editing applications, or any other application. In some embodiments, processor 102 may receive input signals from input component 110 and/or drive output signals through output component 112.

Processor 102 may load a user interface program (e.g., a program stored in memory 104 or another device or server) to determine how instructions or data received via input component 110 may manipulate the way in which information is stored and/or provided to the user via output component 112. Electronic device 100 (e.g., processor 102, memory 104, or any other components available to device 100) may be configured to process graphical data at various resolutions, frequencies, intensities, and various other characteristics as may be appropriate for the capabilities and resources of device 100.

Memory 104 may include one or more storage mediums, including for example, a hard-drive, flash memory, permanent memory such as read-only memory ("ROM"), semi-permanent memory such as random access memory ("RAM"), any other suitable type of storage component, or any combination thereof. Memory 104 may include cache memory, which may be one or more different types of memory used for temporarily storing data for electronic device applications. Memory 104 may store media data (e.g., music and image files), software (e.g., for implementing functions on device 100), firmware, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable device 100 to establish a wireless connection), subscription information (e.g., information that keeps track of podcasts or television shows or other media that a user may subscribe to), contact information (e.g., telephone numbers and e-mail addresses), calendar information, any other suitable data, or any combination thereof.

Communications circuitry 106 may be provided to allow device 100 to communicate with one or more other electronic devices or servers using any suitable communications protocol. For example, communications circuitry 106 may support Wi-Fi (e.g., an 802.11 protocol), Ethernet, Bluetooth™, high frequency systems (e.g., 900 MHz, 2.4 GHz, and 5.6 GHz communication systems), infrared, transmission control protocol/internet protocol ("TCP/IP") (e.g., any of the protocols used in each of the TCP/IP layers), hypertext transfer protocol ("HTTP"), BitTorrent™, file transfer protocol ("FTP"), real-time transport protocol ("RTP"), real-time streaming protocol ("RTSP"), secure shell protocol ("SSH"), any other communications protocol, or any combination thereof. Communications circuitry 106 may also include circuitry that can enable device 100 to be electrically coupled to another device (e.g., a host computer or an accessory device) and communicate with that other device, either wirelessly or via a wired connection.

Power supply 108 may provide power to one or more of the components of device 100. In some embodiments, power supply 108 can be coupled to a power grid (e.g., when device 100 is not used as a portable device, but as a desktop computer). In some embodiments, power supply 108 can include one or more batteries for providing power (e.g., when device 100 is used as a portable device, such as a cellular telephone). As another example, power supply 108 can be configured to generate power from a natural source (e.g., solar power using solar cells).

One or more input components 110 may be provided to permit a user to interact or interface with device 100. For example, input component 110 can take a variety of forms, including, but not limited to, a touch pad, dial, click wheel, scroll wheel, touch screen, one or more buttons (e.g., a keyboard), mouse, joy stick, track ball, microphone, camera, proximity sensor, light detector, motion sensors, and combinations thereof. Each input component 110 can be configured to provide one or more dedicated control functions for making selections or issuing commands associated with operating device 100. Electronic device 100 may also include one or more output components 112 that may present information (e.g., graphical, audible, and/or tactile information) to a user of device 100. Output component 112 of electronic device 100 may take various forms, including, but not limited to, audio speakers, headphones, audio line-outs, visual displays, antennas, infrared ports, rumblers, vibrators, or combinations thereof.

For example, output component 112 of electronic device 100 may include a display. Such a display may include any suitable type of display or interface for presenting visual data to a user. In some embodiments, such a display may include a display embedded in device 100 or coupled to device 100 (e.g., a removable display). Such a display may include, for example, a liquid crystal display ("LCD"), a light emitting diode ("LED") display, an organic light-emitting diode ("OLED") display, a surface-conduction electron-emitter display ("SED"), a carbon nanotube display, a nanocrystal display, any other suitable type of display, or combination thereof. Alternatively, such a display can include a movable display or a projecting system for providing a display of content on a surface remote from electronic device 100, such as, for example, a video projector, a head-up display, or a three-dimensional (e.g., holographic) display. As another example, such a display may include a digital or mechanical viewfinder, such as a viewfinder of the type found in compact digital cameras, reflex cameras, or any other suitable still or video camera.

In some embodiments, such a display may include display driver circuitry, circuitry for driving display drivers, or both. Such a display can be operative to display content (e.g., media playback information, application screens for applications implemented on electronic device 100, information regarding ongoing communications operations, information regarding incoming communications requests, device operation screens, etc.) that may be under the direction of processor 102. Such a display can be associated with any suitable characteristic dimensions defining the size and shape of the display. For example, the display can be rectangular or have any other polygonal shape, or alternatively can be defined by a curved or other non-polygonal shape (e.g., a circular display). Such a display can have one or more primary orientations for which an interface can be displayed, or can instead or in addition be operative to display an interface along any orientation selected by a user.

It should be noted that one or more input components and one or more output components may sometimes be referred to collectively herein as an input/output ("I/O") component or I/O interface. For example, input component 110 and output component 112 may sometimes be a single I/O component 114, such as a touch screen, that may receive input information through a user's touch of a display screen and that may also provide visual information to a user via that same display screen.

Electronic device 100 may also be provided with a housing 101 that may at least partially enclose one or more of the components of device 100 for protection from debris and other degrading forces external to device 100. In some embodiments, one or more of the components may be provided within its own housing (e.g., input component 110 may be an independent keyboard or mouse within its own housing that may wirelessly or through a wire communicate with processor 102, which may be provided within its own housing).

Figure 2:
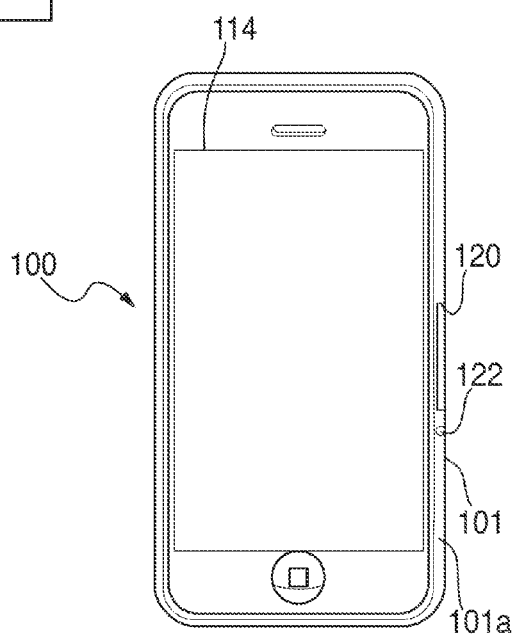
FIG. 2 is a front view of the electronic device of FIG. 1, in accordance with at least one embodiment of the invention.

FIG. 2 is a front view of electronic device 100, in accordance with some embodiments. As shown in FIG. 2, housing 101 may at least partially enclose I/O component 114. Moreover, housing 101 may include a retention aperture 120 (e.g., which may be configured as part of a removable entity retention system of device 100 for retaining one or more removable entities (not shown)) through a portion of housing 101 for passing at least one removable entity (e.g., a tray, a SIM card, etc.) into device 100. The at least one removable entity may be included as part of memory of device 100 (e.g., memory 104 of FIG. 1). Housing 101 may also include an ejection tool hole 122 (e.g., which may be configured as part of a removable entity ejection system of device 100 for ejecting one or more removable entities) through a portion of housing 101 for passing at least one ejection tool (e.g., a paper clip) into device 100. It should be appreciated that, although FIG. 2 may show retention aperture 120 and ejection tool hole 122 situating on a specific portion of housing 101 (e.g., on surface side 101a of housing 101), each of retention aperture 120 and ejection tool hole 122 may reside on any suitable portion of housing 101.

Figure 3A:
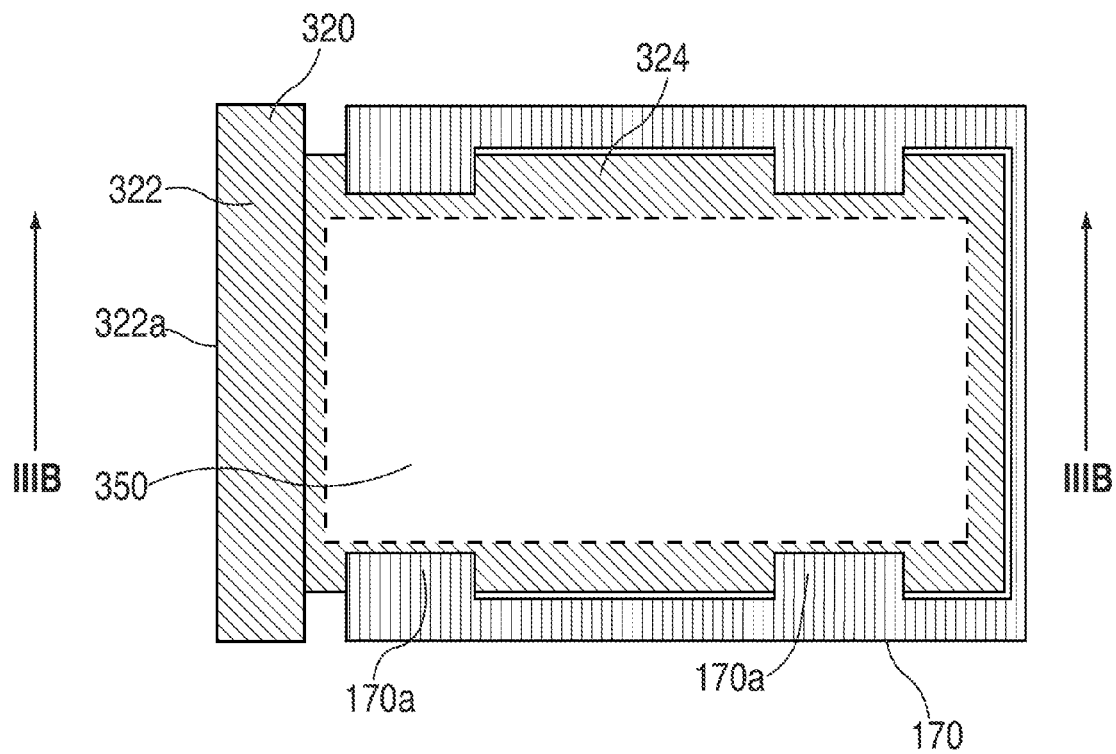
FIG. 3A is a plan view of a first removable entity supporting a second removable entity, in accordance with at least one embodiment of the invention.

FIG. 3A is a plan view of a first removable entity 320 supporting a second removable entity 350, in accordance with some embodiments. Retention support 170 may, in conjunction with retention aperture 120, form at least a part of the removable entity retention system of device 100. First removable entity 320 (e.g., a SIM card tray) may be configured to support second removable entity 350 (e.g., a SIM card), and may include a head 322 and a body 324. Second removable entity 350 may fit within an inner boundary of body 324 and may reside on various support portions of body 324 (not shown). When first removable entity 320 is fully inserted into device 100 (e.g., by passing through retention aperture 120), surface 322a of head 322 may align with surface side 101a of housing 101. In some embodiments, instead of housing 101 including ejection tool hole 122, first removable entity 320 may include such a hole. Body 324 may include any number of suitable openings for allowing access to electrical contacts (not shown) that may be included on a face of second removable entity 350. Such electrical contacts may provide connectivity between second removable entity 350 and any electronic and/or electrical components of an electronic device situated near or beneath first removable entity 320 and second removable entity 350 when first removable entity 320 and second removable entity 350 are fully inserted into device 100 (e.g., through retention aperture 120). Retention support 170 may support first removable entity 320 via retention support members 170a and various other support structures (not shown) of retention support 170.

Figure 3B:
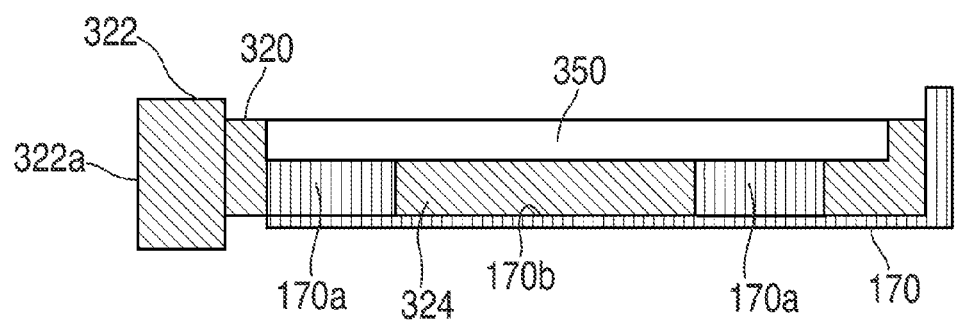
FIG. 3B is a side view of the first removable entity and the second removable entity of FIG. 3A, taken from line IIIB-IIIB of FIG. 3A, in accordance with at least one embodiment of the invention.

FIG. 3B is a side view of first removable entity 320 and second removable entity 350, taken from line IIIB-IIIB of FIG. 3A, in accordance with some embodiments. As shown in FIG. 3B, retention support 170 may support first removable entity 320 (e.g., via support surface 170b and retention support members 170a). Second removable entity 350 may, in turn, reside on suitable support portions of first removable entity 320.

Figure 4A:
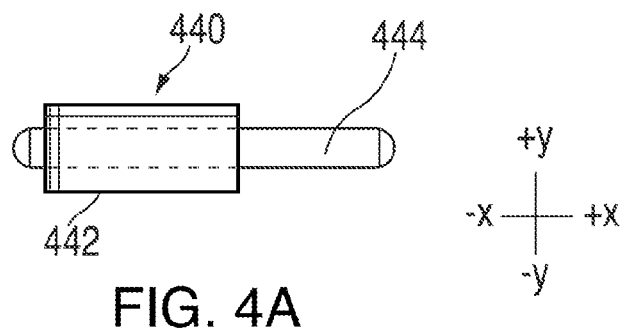
FIG. 4A is a plan view of a driver for use in a removable entity ejection system, in accordance with at least one embodiment of the invention.
Figure 4B:
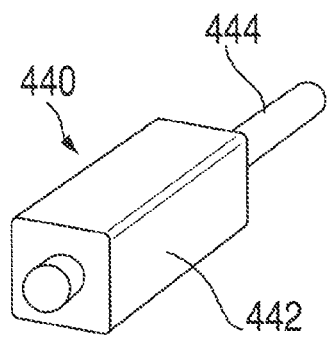
FIG. 4B is a perspective view of the driver of FIG. 4A, in accordance with at least one embodiment of the invention.

FIG. 4A is a plan view of a driver 440 for use in a removable entity ejection system, in accordance with some embodiments. FIG. 4B is a perspective view of driver 440, in accordance with some embodiments. Driver 440 may include a driving unit 442 and a driving component 444. In some embodiments, driving unit 442 may be coupled to a power source (e.g., power supply 108) and a controller (e.g., controller 102) of device 100. For example, the controller may control the coupling of the power source to driving unit 442 in response to a user instruction (e.g., via I/O interface 114) to eject a removable entity. In other embodiments, driving unit 442 may simply be coupled to the controller, where signals sent from the controller to driving unit 442 may be sufficient to operate driving unit 442 (e.g., to direct driving component 444 to move with respect to driving unit 442).

In some embodiments, driving component 444 may be directed to move in any direction with respect to driving unit 442 (e.g., in the X-axis as shown). In other embodiments, driving component 444 may be directed to move in any direction in the Y-axis or in any other suitable direction of any other axis with respect to driving unit 442. When driving component 444 moves in a particular direction, driver 440 may be in an actuated state. When driving component 444 moves in an opposite direction, driver 440 may be in a non-actuated state. The position of driving component 444 shown in FIGS. 4A and/or 4B may represent any of the actuated state and the non-actuated state of driver 440. Further, as indicated above, it should be appreciated that driver 440 may be in the form of any type of motor or actuator that may include at least one moving member or driving component that can be electrically controlled to move with respect to another component of an electronic device (e.g., with respect to a driving unit).

Figure 5A:
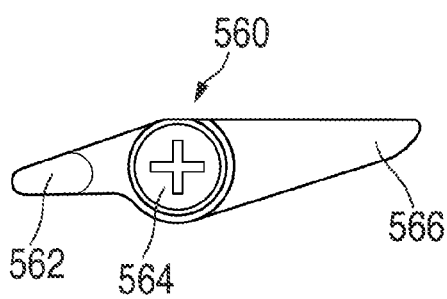
FIG. 5A is a plan view of an ejection arm for use in a removable entity ejection system, in accordance with at least one embodiment of the invention.
Figure 5B:
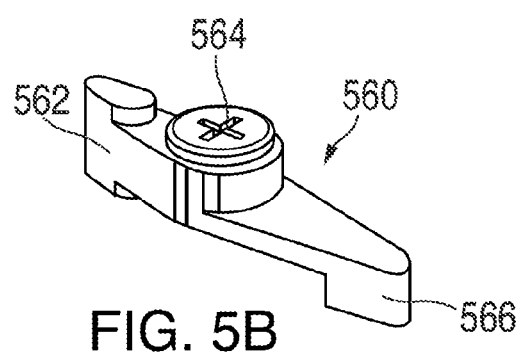
FIG. 5B is a perspective view of the ejection arm of FIG. 5A, in accordance with at least one embodiment of the invention.

FIG. 5A is a plan view of an ejection arm 560 for use in a removable entity ejection system, in accordance with some embodiments. FIG. 5B is a perspective view of ejection arm 560, in accordance with some embodiments. Ejection arm 560 may include an end portion 562, a coupling portion 564, and a contact portion 566. Coupling portion 564 may be coupled to any suitable component within device 100 such that coupling portion 564 may act as a pivot for ejection arm 560. In this manner, ejection arm 560 may be capable of rotating in the clockwise direction of arrow CW (or the counter-clockwise direction of arrow CCW) about coupling portion 564. Coupling portion 564 may include any suitable features (e.g., a screw, a clip, solder, and any other securing component) for coupling ejection arm 560 to device 100. Contact portion 566 may be configured to couple with or exert an ejection force on, either directly or indirectly, one or more removable entities during ejection thereof. For example, contact portion 566 may be configured to exert an ejection force on a suitable portion of body 324 of first removable entity 320. End portion 562 may be configured to receive an ejection force (e.g., from a tool inserted into device 100 via ejection tool hole 122) that may cause ejection arm 560 to rotate in any suitable direction such that contact portion 566 may exert an ejection force on the one or more removable entities. In some embodiments, housing 101 may not include ejection tool hole 122 for insertion of a tool. In these embodiments, ejection arm 560 may not include end portion 562.

As shown in FIG. 5B, end portion 562 and contact portion 566 and may each protrude from a structural frame of ejection arm 560, and may protrude in similar or in different proportions. In some embodiments, the extent of each protrusion may be set arbitrarily or may be based on spacing requirements within device 100.

FIG. 6A is a plan view of a removable entity ejection system, in a first state, in accordance with some embodiments. The removable entity ejection system may include driver 440 and ejection arm 560, and may be configured to eject first removable entity 320 from device 100. For example, the removable entity retention system of device 100 (e.g., retention aperture 120 and retention support 170) may retain first removable entity 320 as shown in FIG. 6A. Retention support 170 may include an opening 172 that may allow driving component 444 of driver 440 to move therethrough during actuation. In the first state (i.e., a non-actuated state) shown in FIG. 6A, driving component 444 may be initially (e.g., in a non-actuated state) contacting at least a portion of body 324 of first removable entity 320, or may initially be in proximity to, but not contacting, body 324 prior to actuation of driver 440. Prior to actuation of driver 440, first removable entity 320 may be in an inserted and/or functional state with respect to an electronic component of the electronic device that may communicate with second removable entity 350 (not shown in FIG. 6A, but that may reside on first removable entity 320).

As shown in FIG. 6A, ejection arm 560 of the removable entity ejection system (e.g., as shown in FIG. 6A) may or may not have any effect with regard to ejecting first removable entity 320 during actuation of driver 440. For example, ejection arm 560 may be an alternative mechanism to driver 440 for ejecting first removable entity 320 from retention support 170 and out of retention aperture 120. That is, instead of ejecting first removable entity 320 using driver 440, ejection tool hole 122 of housing 101 of device 100 may receive an ejection tool (not shown) in the direction of arrow I for ejecting first removable entity 320. As a result, the ejection tool may contact and move or displace end portion 562 of ejection arm 560 in a clockwise direction CW with respect to coupling portion 564. Consequently, contact portion 566 may similarly move such that a surface of contact portion 566 may contact a suitable portion of first removable entity 320 (e.g., head 322) and apply an ejection force in the direction of arrow E on.

FIG. 6B is a plan view of the removable entity ejection system of FIG. 6A, in a second state, in accordance with some embodiments. Upon actuation of driving unit 442 of driver 440, driving component 444 may move in the direction of arrow E and may contact at least a portion of body 324 of first removable entity 320. The force of this contact may be predefined so as to be sufficient to move or displace first removable entity 320 to eject out of retention aperture 120 in the direction of arrow E. For example, the force may be predefined so as to move or display first removable entity 320 from housing 101 by a distance d.

Figure 6C:
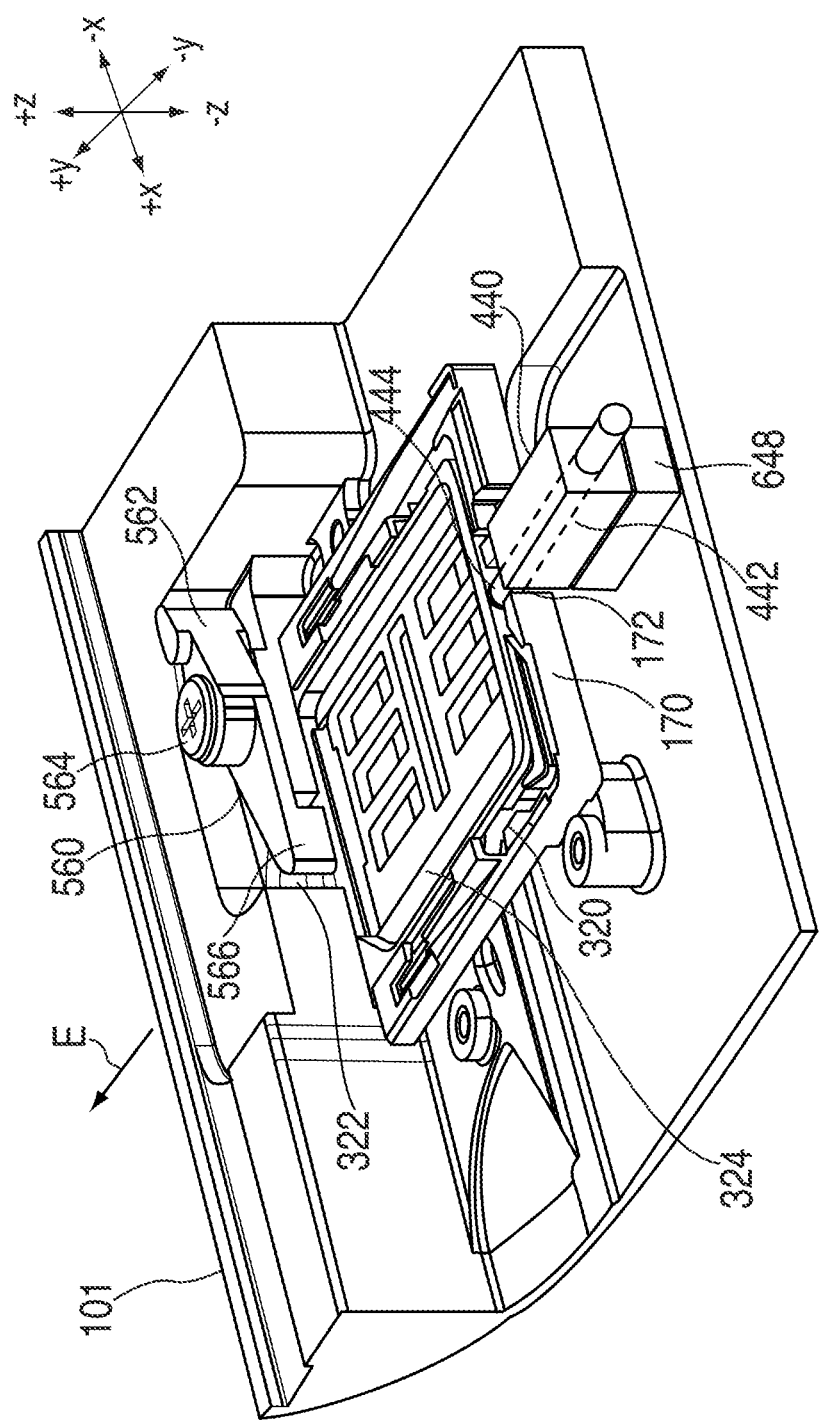
FIG. 6C is a perspective view of the removable entity ejection system of FIG. 6A, in the first state of FIG. 6A, in accordance with at least one embodiment of the invention.

FIG. 6C is a perspective view of the removable entity ejection system of FIG. 6A, in the first state of FIG. 6A, in accordance with some embodiments. As shown, driver 440 may be in a non-actuated state and first removable entity 320 may be in an inserted state (e.g., prior to ejection thereof). This can be compared with FIG. 6A, where first removable entity 320 may be fully inserted (e.g., through retention aperture 120) and/or supported by retention support 170, prior to ejection thereof. As shown in FIG. 6C, a driver stand 648 may also raise driver 440 such that driving component 444 may align with a suitable portion of body 324 of first removable entity 320 to cause ejection thereof.

Figure 6D:
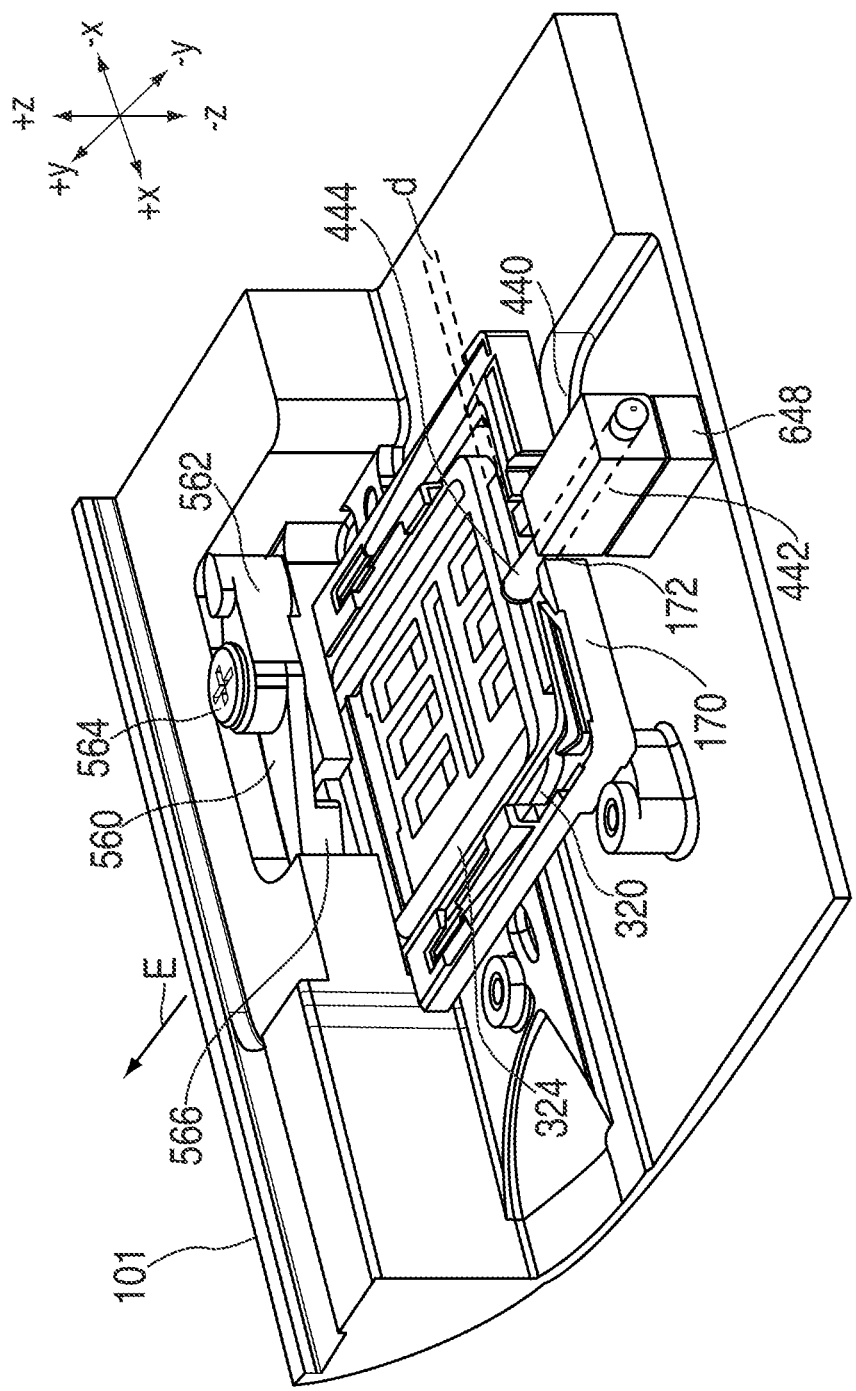
FIG. 6D is a perspective view of the removable entity ejection system of FIG. 6B, in the second state of FIG. 6B, in accordance with at least one embodiment of the invention.

FIG. 6D is a perspective view of the removable entity ejection system of FIG. 6B, in the second state of FIG. 6B, in accordance with some embodiments. As shown, driver 440 may be in an actuated state and first removable entity 320 may be in an ejected state (e.g., ejected from a portion of retention support 170 by distance d).

FIG. 7A is a plan view of an alternative removable entity ejection system, in a first state, in accordance with some embodiments. This alternative removable entity ejection system may also include driver 440 and ejection arm 560, but may also include pushing arm 780. Similar to the removable entity ejection system of FIGS. 6A-6D, the alternative removable entity ejection system of FIG. 7A may also be configured to eject first removable entity 320 which may be inserted through and/or supported by the removable entity retention system of device 100 (e.g., retention aperture 120 and retention support 170). Pushing arm 780 may include a coupling portion 782, a contact portion 784, and a dimple portion 786. Coupling portion 782 may be coupled to any suitable component within device 100 in a manner that may allow coupling portion 782 to act as a pivot for arm 780. Thus, pushing arm 780 may be capable of rotating in the direction of clockwise arrow CW or counter-clockwise arrow CCW. Coupling portion 782 may include any suitable mechanism (e.g., a screw, a clip, solder, and/or any other securing component) for securing pushing arm 780 to device 100. Dimple portion 786 may include a recess for receiving a portion of driving component 444 (e.g., a tip of driving component 444). As shown in FIG. 7A, driver 440 may be in a non-actuated state that may be similar to the non-actuated state of FIG. 6A.

FIG. 7B is a plan view of the alternative removable entity ejection system of FIG. 7A, in a second state, in accordance with some embodiments. As shown in FIG. 7B, driver 440 may be in an actuated state that may be similar to the actuated state of FIG. 7B. In particular, upon actuation of driver 440, driving component 444 may move in the direction of arrow E to exert a force on the recess of dimple portion 786. In response to receiving this force, dimple portion 786 may move or displace in a downward or clockwise direction of arrow CW about coupling portion 782. Consequently, contact portion 784 may also move in the clockwise direction of arrow CW, and may be impart a corresponding force on a surface of contact portion 566 of ejection arm 560. That is, contact portion 784 (which may align with contact portion 566) may impart the corresponding force in the direction of arrow CW on the surface of contact portion 566 to move or displace arm 560 in the clockwise direction of arrow CW. Contact portion 566 of ejection arm 560 may also be configured to align with at least a portion of first removable entity 320 (e.g., head 322). In response to receiving this corresponding force, a different surface of contact portion 566 may contact first removable entity 320 to impart an ejection force in the direction of arrow CW to move or displace first removable entity 320 in the direction of arrow E out from retention aperture 120.

Figure 7C:
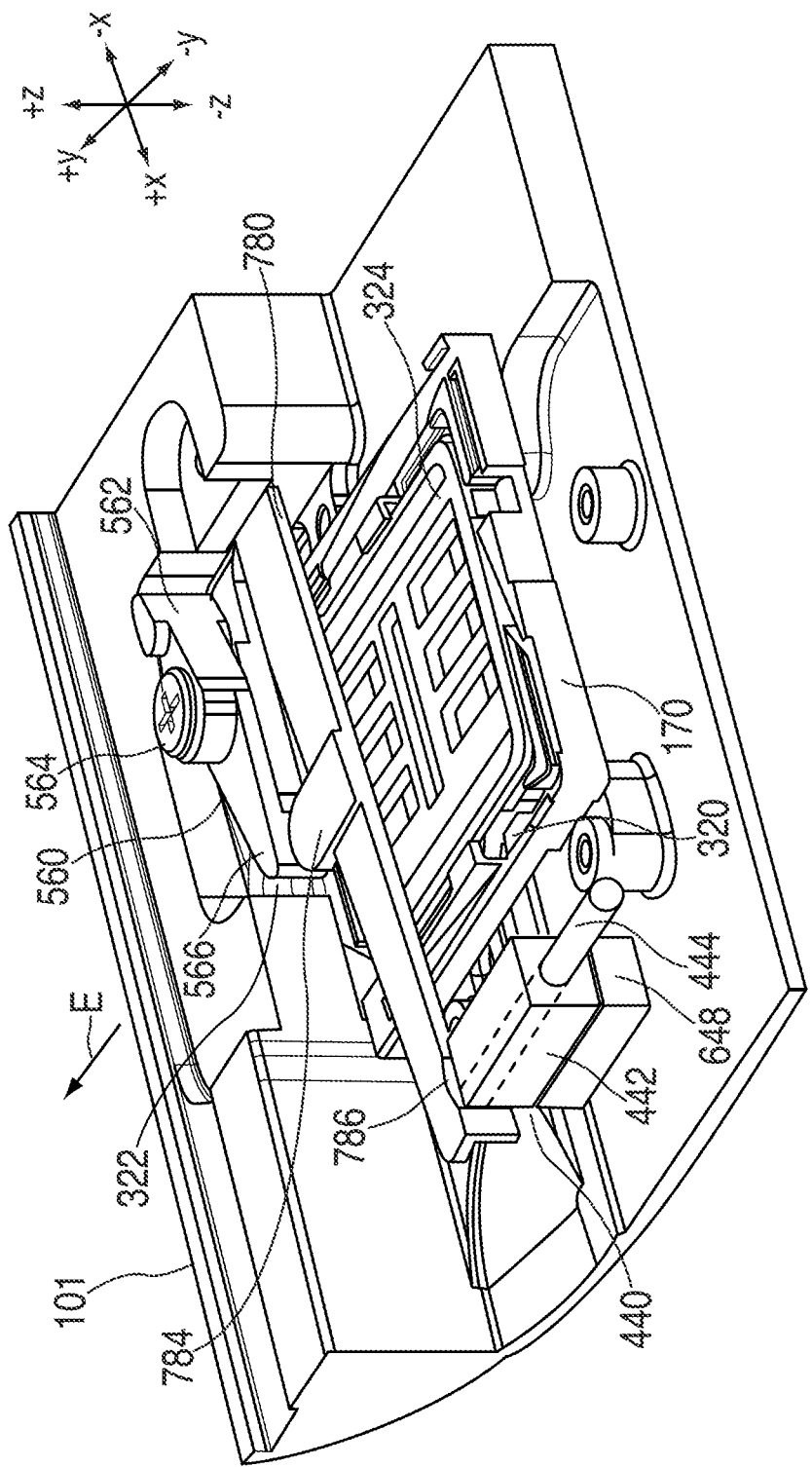
FIG. 7C is a perspective view of the alternative removable entity ejection system of FIG. 7A, in the first state of FIG. 7A, in accordance with at least one embodiment of the invention.

FIG. 7C is a perspective view of the removable entity ejection system of FIG. 7A, in the first state of FIG. 7A, in accordance with some embodiments. As shown, driver 440 may be in a non-actuated state and first removable entity 320 may be in an inserted state (e.g., prior to ejection thereof). This can be compared with FIG. 7A, where first removable entity 320 may be fully inserted (e.g., into retention aperture 120) and/or supported by retention support 170, prior to ejection thereof. As shown in FIG. 7C, a driver stand 648 may also raise driver 440 such that driving component 444 may align with dimple portion 768.

Figure 7D:
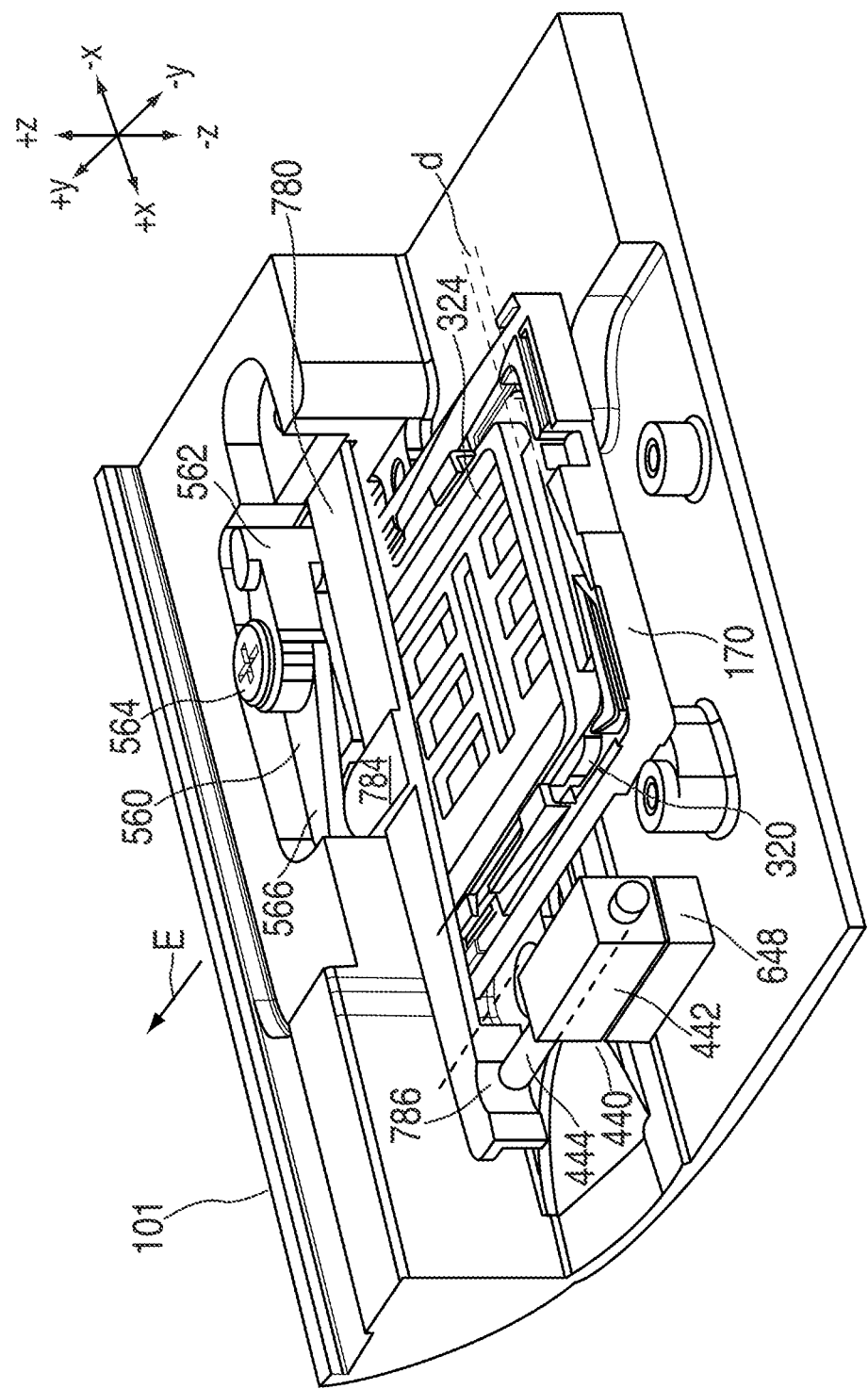
FIG. 7D is a perspective view of the alternative removable entity ejection system of FIG. 7B, in the second state of FIG. 7B, in accordance with at least one embodiment of the invention.

FIG. 7D is a perspective view of the removable entity ejection system of FIG. 7B, in the second state of FIG. 7B, in accordance with some embodiments. As shown, driver 440 may be in an actuated state and first removable entity 320 may be in an ejected state (e.g., ejected from a portion of retention support 170 by distance d).

Figure 8A:
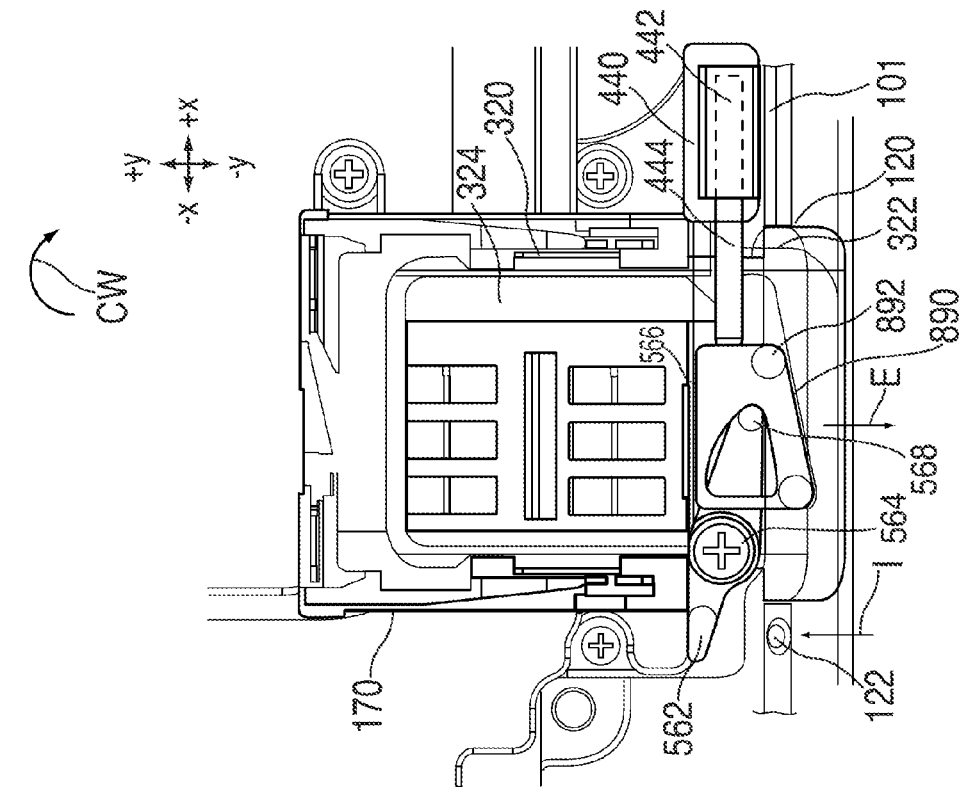
FIG. 8A is a plan view of another alternative removable entity ejection system, in a first state, in accordance with at least one embodiment of the invention.

FIG. 8A is a plan view of another alternative removable entity ejection system, in a first state, in accordance with some embodiments. Similar to the removable entity ejection systems of FIGS. 6A and 7A, the alternative removable entity ejection system of FIG. 8A may also include driver 440 and ejection arm 560, but may also include a guiding member 890. The combination of driver 440, ejection arm 560, and guiding member 890 may orchestrate ejection of first removable entity 320 from device 100. Guiding member 890 may include a curved opening 892, and may be configured to move or displace in any suitable direction in the X-axis within device 100. In particular, guiding member 890 may move or displace along one or more paths (not shown) that may be a part of one or more structures within housing 101. As shown in FIG. 8A, ejection arm 560 may include an extra notch 568 that may fit within curved opening 892. Notch 568 (and thus contact portion 566) may move or displace in the clockwise direction of arrow CW about coupling portion 564 when guiding member 590 moves or displaces substantially in the −X direction. For example, guiding member 890 may move or displace in the −X direction upon actuation of driver 440. As shown in FIG. 8A, driver 440 may be in a non-actuated state that may be similar to the non-actuated states of FIGS. 6A and 7A.

Figure 8B:
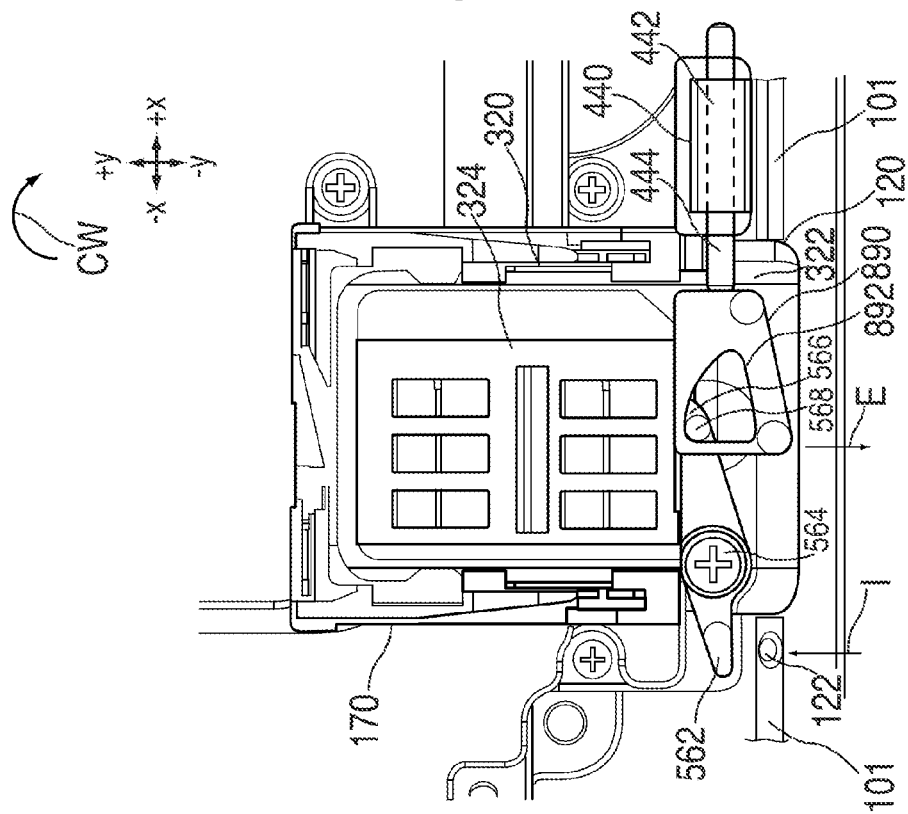
FIG. 8B is a plan view of the alternative removable entity ejection system of FIG. 8A, in a second state, in accordance with at least one embodiment of the invention.

FIG. 8B is a plan view of the alternative removable entity ejection system of FIG. 8A, in a second state, in accordance with some embodiments. Upon actuation of driver 440, driving component 444 may move or displace in the −X direction with respect to driving unit 442 and may contact and exert a force on a portion of guiding member 890. In response to this force, guiding member 890 may move or displace in the −X direction and may guide notch 568 (and thus contact portion 566) to move or displace in the clockwise direction of arrow CW within curved opening 892. Consequently, contact portion 566 may exert an ejection force in the direction of arrow E on first removable entity 320 to eject from device 100 in the direction of arrow E.

Figure 8C:
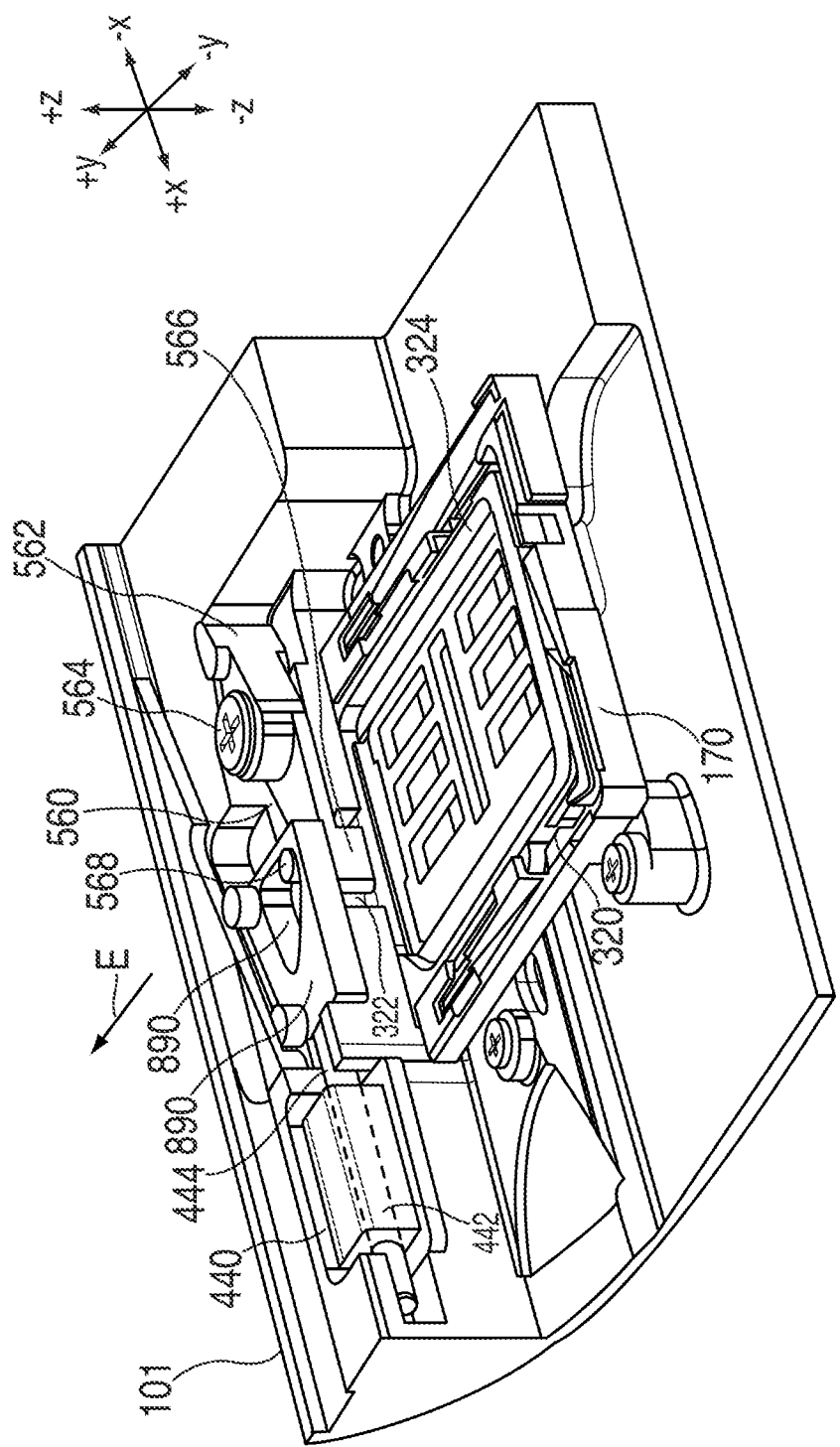
FIG. 8C is a perspective view of the alternative removable entity ejection system of FIG. 8A, in the first state of FIG. 8A, in accordance with at least one embodiment of the invention.

FIG. 8C is a perspective view of the removable entity ejection system of FIG. 8A, in the first state of FIG. 8A, in accordance with some embodiments. As shown, driver 440 may be in a non-actuated state and first removable entity 320 may be in an inserted state (e.g., prior to ejection thereof). This can be compared with FIG. 8A, where first removable entity 320 may be fully inserted (e.g., into retention aperture 120) and/or supported by retention support 170, prior to ejection thereof. As shown in FIG. 8C, a platform may also raise driver 440 such that driving component 444 may align with a suitable portion of guiding member 890.

FIG. 8D is a perspective view of the removable entity ejection system of FIG. 8B, in the second state of FIG. 8B, in accordance with some embodiments. As shown, driver 440 may be in an actuated state and first removable entity 320 may be in an ejected state (e.g., ejected from a portion of retention support 170 by distance d).

FIG. 8E is a plan view of an alternative guiding member that may be a part of the alternative removable entity ejection system of FIG. 8A, in accordance with some embodiments. Because curved opening 892 of guiding member 890 may not suitably align with notch 568, in some embodiments, guiding member 870 may be employed instead of guiding member 890. Guiding member 870 may be similar to guiding member 890, but may include a smaller curved opening 872 that may more closely align with notch 568. In this manner, notch 568 may move or displace in a more controlled manner in response to movement or displacement of guiding member 870.

In some embodiments, after first removable entity 320 is ejected from device 100, one, some, or all of pushing arm 780, guiding member 890, ejection arm 560, and driving component 444 may revert to their respective initial positions shown in FIGS. 7A and 8A. As an example, after first removable entity 320 is ejected from device 100, driving unit 442 may control driving component 444 to displace back to its initial position (e.g., the initial position of driving component 444, as shown in FIG. 7A). As another example, guiding member 890 may be coupled to driving component 444. In this example, after first removable entity 320 is ejected from device 100, driving unit 442 may control driving component 444 to displace back to its initial position (e.g., the initial position of driving component 444, as shown in FIG. 8A), which may, in turn, displace guiding member 890 back to its initial position (e.g., the initial position of guiding member 890, as shown in FIG. 8A). In this manner, when first removable entity 320 is inserted (e.g., manually by a user) back into device 100 through retention aperture 120, one, some, or all of pushing arm 780, guiding member 890, ejection arm 560, and driver 440 may be prepared for a subsequent ejection of first removable entity 320. In other embodiments, one, some, or all of pushing arm 780, guiding member 890, ejection arm 560, and driving component 444 may remain in their respective ejection positions shown in FIGS. 7B and 8B (e.g., after actuation of driver 440) until first removable entity 320 is inserted back into the device. As an example, after first removable entity 320 is ejected from device 100, when first removable entity 320 is subsequently inserted (e.g., by a user) back into device 100, head 322 of first removable entity 320 may interact with contact portion 566 of ejection arm 560 and displace ejection arm 560 back to its initial position (e.g., the initial position of ejection arm 560, as shown in FIG. 7A). Contact portion 566 may, in turn, interact with contact portion 784 of pushing arm 780 and displace pushing arm 780 back to its initial position (e.g., the initial position of pushing arm 780, as shown in FIG. 7A).

In some embodiments, similar to the removable entity ejection system of FIG. 6A, the removable entity ejection systems of FIGS. 7A-7D and 8A-8D may eject first removable entity 320 without the use of driver 440 and pushing arm 780 (or guiding member 890). For example, ejection arm 560 may be an alternative mechanism to driver 440 and pushing arm 780 (or guiding member 890) for ejecting first removable entity 320 from retention support 170 and out of retention aperture 120. That is, instead of ejecting first removable entity 320 using driver 440, ejection tool hole 122 of housing 101 of device 100 may receive an ejection tool (not shown) in the direction of arrow I for ejecting first removable entity 320. As a result, the ejection tool may contact and move or displace end portion 562 of ejection arm 560 in a clockwise direction CW with respect to coupling portion 564. Consequently, contact portion 566 may similarly move such that a surface of contact portion 566 may contact a suitable portion of first removable entity 320 (e.g., head 322) and apply an ejection force in the direction of arrow E. In this manner, even if driver 440 or pushing arm 780 (or guiding member 890) malfunctions, or is otherwise impeded from movement, first removable entity 320 may still be manually ejectable by a user.

It should be appreciated that the removable entity ejection systems of FIGS. 7A-7D and 8A-8D may each employ ejection arm 560 during manual and electrically-controlled ejections of first removable entity 320. Thus, even if one or more of driver 440, pushing arm 780, and guide member 890 malfunctions, first removable entity 320 may still be ejectable by manual ejection (e.g., by inserting an ejection tool into ejection tool hole 122 to apply a force to end portion 562 of ejection arm 560).

Figure 9:
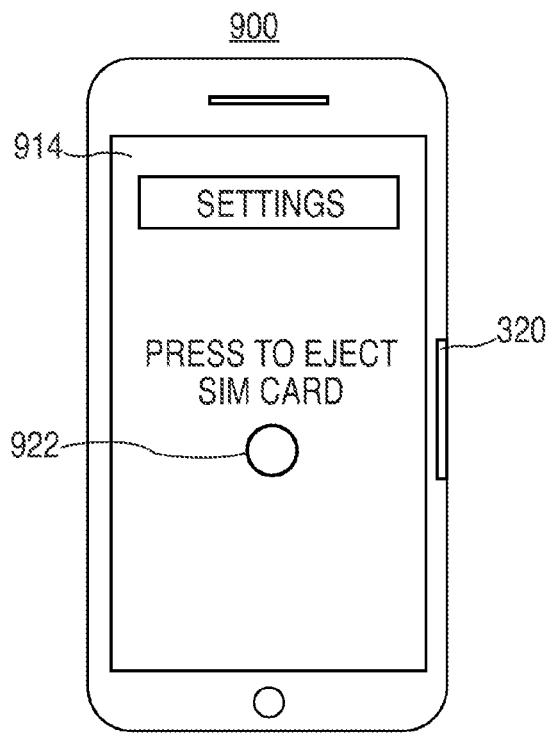
FIG. 9 is a front view of the electronic device of FIGS. 1 and 2 presenting a display screen that includes an option for ejecting a removable entity, in accordance with at least one embodiment of the invention.

FIG. 9 is a front view of electronic device 100 presenting a display screen that includes an option for ejecting a removable entity, in accordance with some embodiments. I/O interface 114 (e.g., a touch screen) may display a display screen 914 that includes an option 922 for ejecting first removable entity 320 and/or second removable entity 350 from device 100. When a user selects option 922 (e.g., by touching an area of I/O interface 114 where option 922 may be displayed), processor 102 may send a control signal to driver 440. In response to receiving the control signal, driver 440 may direct driving component 444 to move or displace to eject first removable entity 320 and/or second removable entity 350 from device 100. It should be appreciated that any of the removable entity ejection systems described with respect to FIGS. 6-8 may be employed to eject first removable entity 320 and/or second removable entity 350 from device 100.

Figure 10:
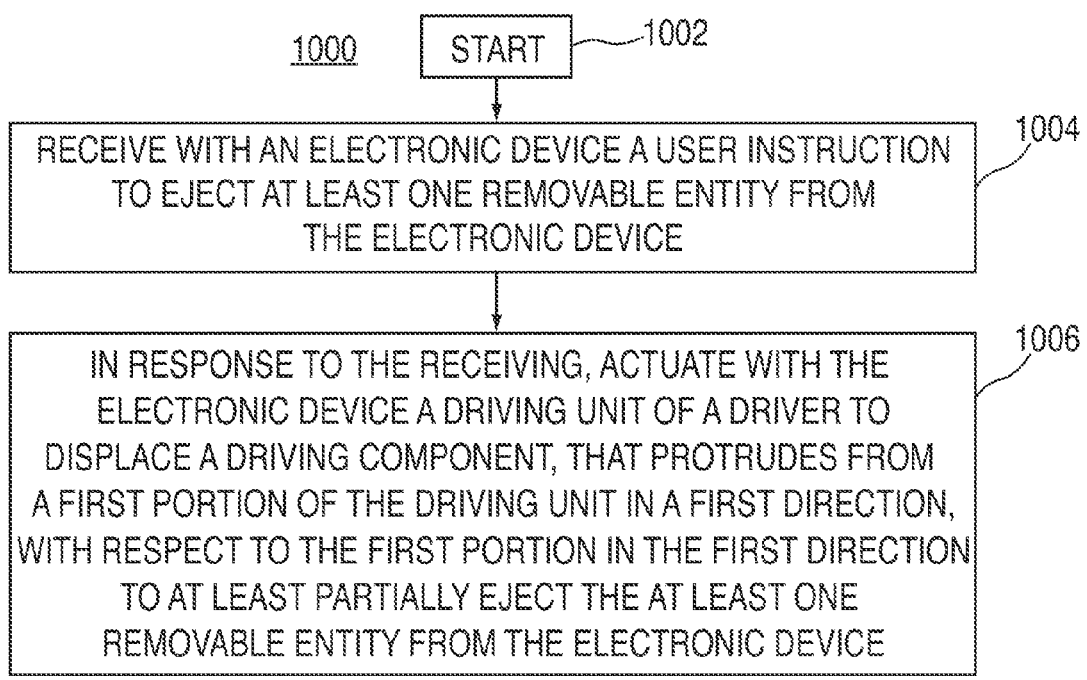
FIG. 10 shows a flowchart of an illustrative method of ejecting at least one removable entity from the electronic device of FIGS. 1, 2, and 9, in accordance with at least one embodiment of the invention.

FIG. 10 shows a flowchart of an illustrative method of ejecting at least one removable entity from electronic device 100 using driver 440 that includes driving unit 442 and driving component 444 protruding from a first portion of driving unit 442 in a first direction, in accordance with some embodiments. Process 1000 may begin at step 1002.

At step 1004, the process may include receiving with the electronic device a user instruction to eject the at least one removable entity from the electronic device. For example, the process may include receiving with I/O interface 114 a user selection of option 922 to eject first removable entity 320, second removable entity 350, or both, from device 100.

At step 1006, in response to the receiving, the process may include actuating with the electronic device the driving unit to displace the driving component with respect to the first portion in the first direction to at least partially eject the at least one removable entity from the electronic device. For example, the process may include, in response to receiving the user selection of option 922, actuating driver 440 via one or more control signals to displace driving component 444 with respect to the first portion in the −Y-direction to at least partially eject first removable entity 320, second removable entity 350, or both, from device 100.

It should be appreciated that step 1006 may include actuating driver 440 of any one of the removable entity ejection systems of FIGS. 6-8. For example, the actuation of driver 440 may cause driving unit 442 to direct driving component 444 to displace from a first position to a second position, as described above with respect to FIGS. 6-8. The displacement of driving component 444 may (i) exert a corresponding force directly onto first removable entity 320 (as described above with respect to FIGS. 6A-6D), (ii) exert a corresponding force on pushing arm 780, and consequently on ejection arm 560 (as described above with respect to FIGS. 7A-7D), or (iii)

exert a corresponding force on guiding member 890, and consequently on ejection arm 560 (as described above with respect to FIGS. 8A-8D) to at least partially eject first removable entity 320 from device 100.

It should be understood that the steps shown in FIG. 10 are merely illustrative. Any of the steps may be removed, modified, or combined, and any additional steps may be added, without departing from the scope of the invention.

It should be appreciated that, in some embodiments, device 100 may be configured to directly receive (e.g., through aperture 120) and support (e.g., via retention support 170 or the like) second removable entity 350 (e.g., a SIM card) without the need for first removable entity 320 (e.g., a SIM card tray). For example, second removable entity 350 may be shaped with some or all of the features of first removable entity 320. For example, second removable entity 350 can include one or more of a head that may be shaped similarly to head 322 of first removable entity 320, and a body that may be shaped similarly to body 324 of first removable entity 320, such that second removable entity 350 may be inserted into and ejected from device 100 in the same way that first removable entity 320 may be inserted into and ejected from device 100. In these embodiments, each of the removable entity ejection systems described with respect to FIGS. 6-8 may be configured to eject second removable entity 350 without interfacing with first removable entity 320. For example, in the removable entity ejection system of FIGS. 6A-6D, driving component 444 may exert a force directly onto a portion of second removable entity 350 when driver 440 is actuated. As another example, in the removable entity ejection systems of FIGS. 7A-7D and 8A-8D, contact portion 566 of ejection arm 560 may exert a force directly onto a portion of second removable entity 350 when driver 440 is actuated. That is, any force that first removable entity 320 may receive to eject first removable entity 320 from device 100, as described above with respect to FIGS. 6-8, may similarly be received by second removable entity 350 to eject second removable entity 350 from device 100.

While there have been described systems and methods for ejecting removable entities from electronic devices, it is to be understood that many changes may be made therein without departing from the spirit and scope of the invention. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements. It is also to be understood that various directional and orientational terms such as "up and "down," "front" and "back," "top" and "bottom," "left" and "right," "length" and "width," and the like are used herein only for convenience, and that no fixed or absolute directional or orientational limitations are intended by the use of these words. For example, the devices of this invention can have any desired orientation. If reoriented, different directional or orientational terms may need to be used in their description, but that will not alter their fundamental nature as within the scope and spirit of this invention. Moreover, an electronic device constructed in accordance with the principles of the invention may be of any suitable three-dimensional shape, including, but not limited to, a sphere, cone, octahedron, or combination thereof, rather than a hexahedron, as illustrated by FIGS. 1-10.

Therefore, those skilled in the art will appreciate that the invention can be practiced by other than the described embodiments, which are presented for purposes of illustration rather than of limitation.

What is claimed is:

1. An electronic device comprising: a housing; and a driver comprising: a driving unit; and a driving component protruding from a first portion of the driving unit in a first direction, wherein the driving unit is configured to displace the driving component with respect to the first portion in the first direction to at least partially eject at least one removable entity from the housing; and the first direction is orthogonal to a direction in which the at least one removable entity at least partially ejects from the housing.

2. The electronic device of claim 1 further comprising control circuitry configured to:
   detect a user instruction to at least partially eject the at least one removable entity from the housing; and
   output an ejection signal to the driving unit in response to the detection of the user instruction.

3. The electronic device of claim 2, wherein the driving unit is configured to:
   receive the outputted ejection signal; and
   displace the driving component with respect to the first portion in the first direction based on the receipt of the outputted ejection signal.

4. The electronic device of claim 1, wherein the driver is configured to directly apply a first force to the at least one removable entity based on the displacement of the driving component.

5. The electronic device of claim 1, wherein the driver is configured to indirectly apply a first force to the at least one removable entity based on the displacement of the driving component.

6. The electronic device of claim 1, wherein:
   the driving component protrudes from the first portion at a first position; and
   the driving unit is configured to:
      displace the driving component with respect to the first portion in the first direction to a second position; and
      after the displacement of the driving component to the second position, revert the displacement of the driving component from the second position to the first position.

7. The electronic device of claim 1, wherein the first direction is the same as a direction in which the at least one removable entity at least partially ejects from the housing.

8. The electronic device of claim 1 further comprising a first movable component and a second movable component, wherein:
   when the driving unit displaces the driving component with respect to the first portion in the first direction, the driving component is configured to apply a first force to a force receiving portion of the first movable component to displace the first movable component;
   a force applying portion of the first movable component is configured to apply a second force to a force receiving portion of the second movable component to displace the second movable component in response to the application of the first force; and
   a force applying portion of the second movable component is configured to apply a third force to at least a portion of the at least one removable entity to at least partially eject the at least one removable entity from the housing in response to the application of the second force.

9. The electronic device of claim 8, wherein:
   the force receiving portion of the first movable component comprises a recess configured to receive the driving component;

the force applying portion of the first movable component comprises a pushing portion configured to push the force receiving portion of the second movable component;

the force receiving portion of the second movable component comprises a first side of an ejection portion of the second moveable component that is configured to receive the pushing portion; and the force applying portion of the second movable component comprises a second side of the ejection portion that is configured to contact the at least a portion of the at least one removable entity.

10. The electronic device of claim 8, wherein:

the force receiving portion of the first movable component comprises a frame configured to receive the driving component;

the force applying portion of the first movable component comprises an opening that forms a path configured to movably guide the force receiving portion of the second movable component;

the force receiving portion of the second movable component comprises a notch that extends from an ejection portion of the second movable component and that is configured to traverse within the opening; and the force applying portion of the second movable component comprises the ejection portion and is configured to contact the at least a portion of the at least one removable entity.

11. The electronic device of claim 10, wherein the opening comprises a pie shape.

12. The electronic device of claim 10, wherein the opening comprises at least two curved sides.

13. The electronic device of claim 8, wherein:

at least one of the housing and the at least one removable entity comprises a hole for insertion of an instrument to apply a fourth force to another force receiving portion of the second movable component; and another force applying portion of the second movable component is configured to apply a fifth force to the at least a portion of the at least one removable entity to at least partially eject the at least one removable entity from the housing in response to the application of the fourth force.

14. The electronic device of claim 1, wherein the at least one removable entity comprises:

a first removable entity; and a second removable entity that resides on at least a portion of the first removable entity.

15. The electronic device of claim 14, wherein:

the first removable entity comprises a subscriber identity module ("SIM") card tray; and the second removable entity comprises a subscriber identity module ("SIM") card.

16. The electronic device of claim 1 further comprising:

a display configured to display at least one option for at least partially ejecting the at least one removable entity from the housing; and an input component configured to receive a user selection of the displayed at least one option.

17. The electronic device of claim 16, wherein the driving unit is configured to displace the driving component with respect to the first portion in the first direction in response to the receipt of the user selection.

18. The electronic device of claim 1, wherein the driver comprises one of a rotary motor, a servomotor, and a linear motor.

19. A method for ejecting at least one removable entity from an electronic device using a driver that comprises a driving unit and a driving component protruding from a first portion of the driving unit in a first direction, the method comprising: receiving with the electronic device a user instruction to eject the at least one removable entity from the electronic device; and in response to the receiving, actuating with the electronic device the driving unit to displace the driving component in the first direction with respect to the first portion to at least partially eject the at least one removable entity from the electronic device, in a second direction orthogonal to the first direction.

20. The method of claim 19 further comprising, prior to the receiving, displaying with the electronic device at least one option for ejecting the at least one removable entity from the electronic device.

21. The method of claim 20, wherein the receiving comprises receiving a user selection of the displayed at least one option.

22. The method of claim 19, wherein the actuating comprises sending at least one control signal to the driving unit.

23. The method of claim 19, wherein the at least partially ejecting comprises one of directly and indirectly applying a force to a portion of the at least one removable entity based on the displacement of the driving component.

24. The method of claim 23, wherein the at least partially ejecting comprises indirectly applying the force by applying the force to at least one interfacing component that interfaces the driving component with the portion of the at least one removable entity.

* * * * *